(12) United States Patent
Justl

(10) Patent No.: US 10,190,700 B2
(45) Date of Patent: Jan. 29, 2019

(54) ROTARY ACTUATOR, AND BEVERAGE FILLING SYSTEM

(71) Applicant: EVOGUARD GMBH, Nittenau (DE)

(72) Inventor: Johann Justl, Sinzing (DE)

(73) Assignee: Evoguard GmbH, Nittenau (DE)

( * ) Notice: Subject to any disclaimer, the term of this patent is extended or adjusted under 35 U.S.C. 154(b) by 0 days.

(21) Appl. No.: 15/453,697

(22) Filed: Mar. 8, 2017

(65) Prior Publication Data

US 2017/0261121 A1 Sep. 14, 2017

(30) Foreign Application Priority Data

Mar. 9, 2016 (DE) .................. 10 2016 203 873

(51) Int. Cl.
| | |
|---|---|
| *F16K 31/528* | (2006.01) |
| *F16K 31/16* | (2006.01) |
| *F16K 31/122* | (2006.01) |
| *F16K 1/22* | (2006.01) |
| *F15B 15/06* | (2006.01) |
| *B67D 1/00* | (2006.01) |
| *F16K 31/163* | (2006.01) |

(52) U.S. Cl.
CPC ............ *F16K 31/5282* (2013.01); *B67D 1/00* (2013.01); *F15B 15/068* (2013.01); *F16K 1/221* (2013.01); *F16K 31/1221* (2013.01); *F16K 31/1635* (2013.01); *B67D 2001/0093* (2013.01)

(58) Field of Classification Search
CPC .......... F16K 31/528–31/5288; F16K 31/1221; F16K 31/1635; F16K 1/221; B67D 1/00; B67D 2001/0093; F15B 15/068

USPC ........ 251/252, 253, 254, 259; 74/25, 55, 56, 74/57

See application file for complete search history.

(56) References Cited

U.S. PATENT DOCUMENTS

| | | | | |
|---|---|---|---|---|
| 712,366 | A | * | 10/1902 | Donoughe .............. F16H 25/12 74/57 |
| 1,052,763 | A | * | 2/1913 | Stone et al. .......... F15B 15/068 123/57.1 |
| 3,184,214 | A | * | 5/1965 | King ................... F16K 31/5282 251/229 |
| 3,186,498 | A | * | 6/1965 | Roll ..................... B25D 11/102 173/205 |
| 3,745,887 | A | * | 7/1973 | Striegl .................... F01B 3/045 123/55.3 |
| 6,666,129 | B1 | | 12/2003 | Schmid et al. |

(Continued)

FOREIGN PATENT DOCUMENTS

| | | |
|---|---|---|
| DE | 4030730 A1 | 4/1992 |
| DE | 19950582 C1 | 9/2001 |
| DE | 102010002621 A1 | 9/2011 |

*Primary Examiner* — Mary McManmon
*Assistant Examiner* — Jonathan Waddy
(74) *Attorney, Agent, or Firm* — McCoy Russell LLP

(57) ABSTRACT

In a rotary actuator comprising a housing containing a piston and having a cover and a base, thread-like guide grooves in the piston, a shaft having a transverse axis and being rotatable about an axis of the rotary actuator which transverse axis engages into the guide grooves, and torque support engaging into guides in the piston, which torque supports are anchored in the housing, wherein the transverse axis on both ends comprises bushes contacting raceways of the guide grooves, each bush is cambered and each raceway is configured with an undercut corresponding to the cambering.

14 Claims, 3 Drawing Sheets

(56) References Cited

U.S. PATENT DOCUMENTS

| | | | |
|---|---|---|---|
| 6,793,194 B1 * | 9/2004 | Grinberg | F15B 15/068 |
| | | | 251/263 |
| 8,667,887 B2 | 3/2014 | Wiedenmann et al. | |
| 2010/0117013 A1 * | 5/2010 | Laurent | F16H 25/186 |
| | | | 251/77 |

* cited by examiner

ROTARY ACTUATOR, AND BEVERAGE FILLING SYSTEM

CROSS-REFERENCE TO RELATED APPLICATIONS

The present application claims priority to German Patent Application No. 10 2016 203 873.7, entitled "Rotary Actuator, and Beverage Filling System," filed on Mar. 9, 2016, the entire contents of which are hereby incorporated by reference for all purposes.

TECHNICAL FIELD

The present disclosure relates to a rotary actuator and a beverage filling system.

BACKGROUND AND SUMMARY

Regarding the rotary actuators known from DE 19950582 C1 and DE 102010002621 A1 for e.g. disk valves in beverage filling systems of this type, the raceways in the guide grooves of the piston are planar and the bushes arranged on the ends of the transverse axis are configured with a cylindrical external circumference. This principle requires positioning the bushes and, if appropriate their bearings on the ends of the transverse axis, for example by means of securing rings or the like so that the bushes during operation of the rotary actuator do not exit e.g. outwardly from the guide grooves. During operation, however, high specific surface pressure occurs between each bush and the raceways of the guide groove. The high surface pressure may result in an early wear. The assembly effort for the required axial securing of the bushes is inappropriate.

The object of the present disclosure is to provide a rotary actuator of the type mentioned in the introductory part, which is characterized by a reduced surface pressure of the bushes and a reduced assembly effort as well as a disk valve with improved operating behavior and a beverage filling system with a reduced maintenance effort.

The cambering and the undercut of the raceway interacting with the cambering increase the contact area between the bush and the raceway, resulting in reduced surface pressure and less wear. Further, during operation, a secure positioning of the bush and an extensive force transfer between large areas occur, which as well has a positive effect on wear and durability. Due to the form-fit between the cambering and the undercut, a separate axial securing of the bushes is omitted, which considerably reduces the assembly effort.

The beverage filling system in relation to the disk valve with this rotary actuator, among other things requires low maintenance.

Regarding an appropriate embodiment, the bush is either double-conically or convexly, and in at least one example, spherically cambered, and the undercut of the raceways either runs double-conically or concavely curved, and in some examples, following a circular arc section. This geometric configuration is simple in terms of manufacturing, contributes to the optimum reduction of the surface pressure and to the reliable axial guidance of the bush.

Regarding an appropriate embodiment, the bush, may via a roller bearing or plain bearing, only be loosely fitted to the end of the transverse axis, e.g. up to a transverse axis shoulder. The bush is axially positioned on the end by form-fitting between the cambering and at least one raceway undercut, without additional aids or assembly steps during the assembly of the rotary actuator.

The track roller with pressed-in plain bearing only needs to be fitted on the transverse axis, which causes less assembly effort.

Particularly appropriate, approximately in the middle between both guide groove ends, each guide groove may have a bush assembly opening, which is at least accessible from the outer circumference of the piston. The assembly opening is usable in order to mount at least the bush on the end of the transverse axis or to replace it rapidly in the event of wear, without having to manipulate tools or securing elements. Thereby, the assembly opening is practically placed approximately in the middle between the two guide grooves, thus, in a region of the guide grooves, in which due to the course of the guide grooves the torque to be transmitted is relatively moderate so that there, the problem of the surface pressure between the raceway and the bush is non-critical, although there the contact area in the raceway somewhat decreases.

The assembly opening is appropriately configured in such a manner that one side of the undercut is removed arcuately in each raceway up to approximately the base of the undercut and corresponding to the contour of the outer circumference of the bush. The temporary lateral interruption of the undercut of the raceway at this point, approximately in the middle between the guide groove ends, has no negative effect on the functionality, since the bushes are moved through this area under relatively moderate load and cannot drop out.

The piston may be appropriately a plastic molded part, and in at least on example, an injection molded part, for example of reinforced polyoxymethylene. This plastic is only an example of a plurality of possibilities and in addition to high wear resistance, offers favorable friction conditions.

In a symmetrical configuration of the rotary actuator, for example, the effective distance of the torque supports from the axis is enlarged for receiving the torques generated by the cambered bushes and the undercut raceways by an approximately rectangular outer cross section of the torque supports with longer rectangular sides, which are approximately tangential to the axis, by parallel shorter rectangular sides, and by guides open to the outer circumference of the piston. The rectangular outer cross-section increases the bending resistance modulus in the direction tangential to the axis, strengthens the anchorage area of the torque support, and increases in interaction with the open guide in the outer circumference of the piston the effective distance to the axis, by means of which distance the torques are received and removed, which are transferred, for example in case of an axis-symmetrical configuration of the rotary actuator, having two bushes, from the cambered bushes and the undercut raceways into the piston.

The torque support, if appropriate, could be fixed at the inner wall of the housing, namely either only there or also on the cover and/or base of the housing. Furthermore, in a different embodiment of the rotary actuator, a single torque support and/or only one bush engaging the guide groove on the transverse axis could be sufficient.

BRIEF DESCRIPTION OF THE FIGURES

An embodiment of the inventive subject matter is described with reference to the drawing. This shows.

DETAILED DESCRIPTION

Figure 1:
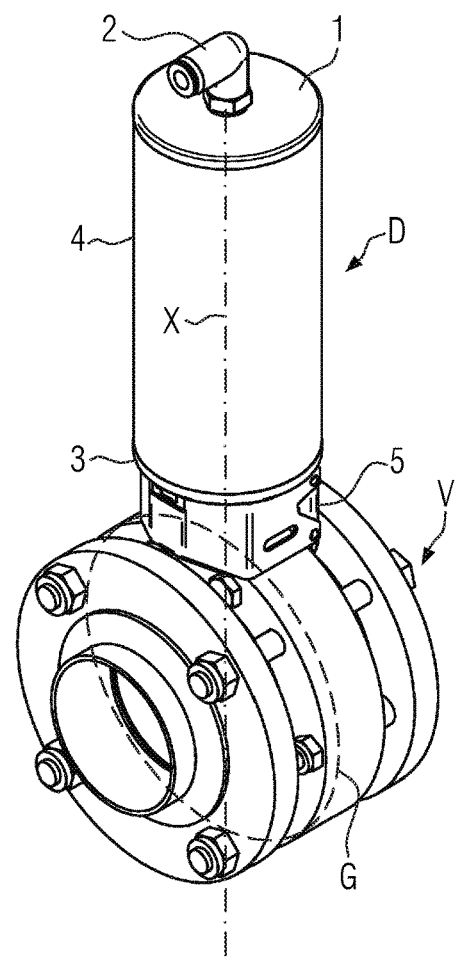
FIG. 1 shows a perspective view of a rotary actuator mounted on a disk valve, for example of a beverage filling system.

As non-limiting example, FIG. 1 shows a disk valve V with a closing element G, shown in dashed lines, and which is rotatable back and forth about an axis X, and which can be actuated by means of a rotary actuator D over a pivot angle of, for example, approximately 90° between an open and a closed position. The disk valve V is, for example, installed in a beverage filling system (not shown).

The rotary actuator D is mounted with a foot part 5 on the disk valve V and comprises a housing 4, here for example cylindrical, with a cover 1 and a base 3. The rotary actuator D here is for example pneumatically actuated via a connection port 2 in the cover 1, for example against a spring, which is not shown in FIG. 1, or electromagnetically actuated by a linear drive, which is not shown (for example even in both actuation directions). In the longitudinal section view in FIG. 2, a shaft 6 is rotatable in the base 3 about the axis X, which extends upwardly into the rotary actuator D and which comprises at the lower end a coupling part 7 for connecting to the closing element G of the disk valve V.

In the upper end of the shaft 6, a transverse axis 8, which is perpendicular to the axis X, and engages here with both its ends 24 (FIG. 3) into diametrically opposite thread-like guide grooves 9 in a skirt 16 of a piston 10, which is configured here as a piston tube. The piston 10 is sealed but slidable in the housing 4, and is loaded by a spring 11. The piston 10 is pressurized or discharged through the connection port 2 by pressurized medium, for example compressed air, and is, thus, shifted back and forth in the direction of the axis X, whereby the transverse axis 8 applies a rotational movement to the shaft 6 via the guide grooves 9. In order to be able to generate this rotational movement, the piston 10 must be supported against rotation in the housing 4 and thereby occurring torques must be absorbed.

The anti-rotation support of the piston 10 in the shown embodiment is achieved by two torque supports 12, which extend from the anchoring points 13, here, for example, on the base 3, upwardly into guides 15 of the piston apron 16 (i.e., piston skirt) and support the piston 10 against rotation or transfer torques arising from the movement of the transverse axis 8 in the guide grooves 9 into the base 3, which is fixedly connected to the disk valve V via the foot part 5. Free ends 14 of the torque supports 12 extend upwardly up to the position of the transverse axis 8. Alternatively, one torque support 12 could be fixed to the base 3 and the other torque support 12 to the cover 1, whereby, the free ends 14 of the torque support 12 may then overlap at the height position of the transverse axis 8. In a further alternative, the torque supports 12 could be fixed only to the cover 1, or more than two axially parallel torque supports 12 and guides 15 could be provided. Furthermore, the respective torque support 12 could be additionally or exclusively fixed to the inner wall of the housing 4.

Figure 3:
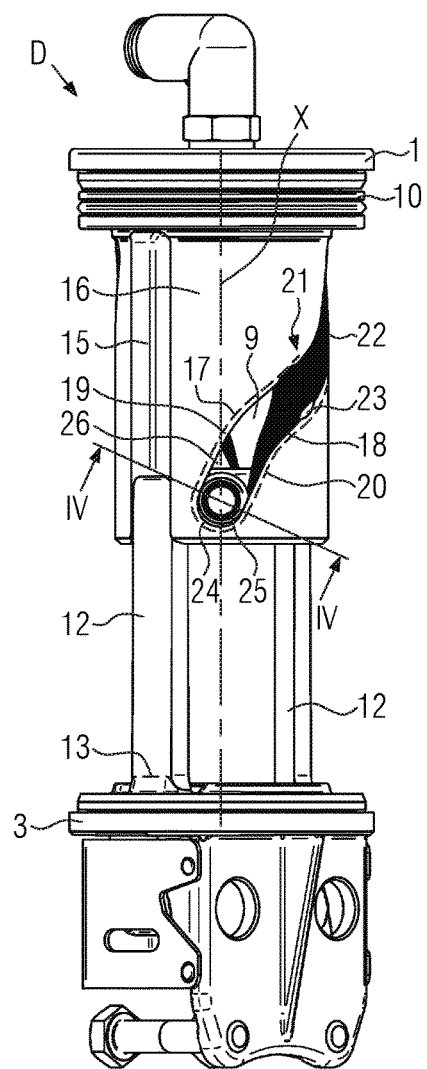
FIG. 3 shows a side view of the rotary actuator by omitting a housing.

In the side view of the rotary actuator D in FIG. 3, for clarity purposes, the housing 4 is omitted, in order to clarify the interaction between the torque supports 12 and the guides 15, as well as the ends 24 of the transverse axis 8 and the guide grooves 9. Each torque support may be a type of a guide bar or a guide web.

With regard to the torques or reaction forces from the torques to be transmitted, each torque support 12 is load-specifically configured and has an optimally high bending modulus in the effective direction of the torques and may provide a great effective distance from the axis X, which reduces component loads. In detail, the torque support 12 has an approximately rectangular outer cross-section with longer rectangle sides 28 lying tangentially to the axis X and planar, shorter rectangle sides 29 which are substantially perpendicular to the longer rectangle sides. The length ratio between the longer rectangle sides 28 and the shorter rectangle sides 29 may amount approximately to 2:1. In the shown embodiment, additionally, the longer rectangle sides 28 of the outer cross-section are cambered (30) or convexly rounded (alternatively double-conically) in order to further increase the bending modulus. Between the longer rectangle side 28 pointing to the axis X and a groove base 33 of the guide 15, an intermediate distance 31 can be provided in order to minimize the extent of the contact areas, which are in frictional contact during the torque transmission.

The torque support 12 and the base 3 or the torque support 12 and the cover 1 are configured unitarily, for example as castings.

Figures 5, 6:
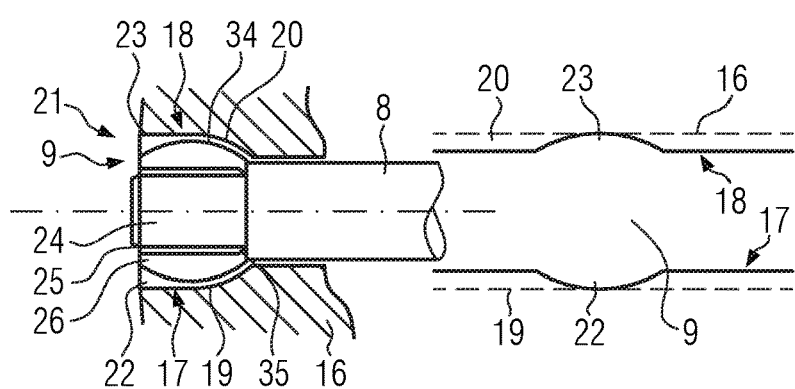
FIG. 5 shows a part sectional view, similar to FIG. 4, at the position of a bush assembly opening.
FIG. 6 shows a side view of FIG. 5.
Figure 2:
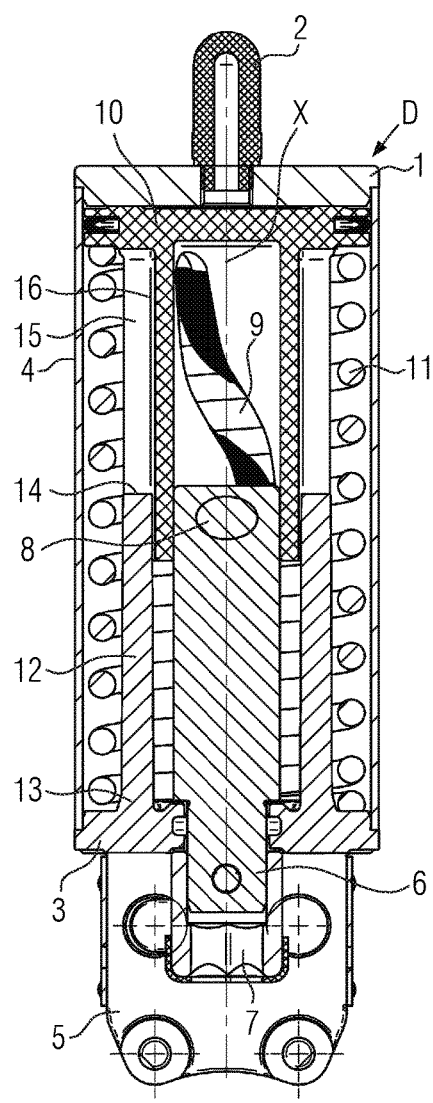
FIG. 2 shows a longitudinal section view of the rotary actuator in non-actuated state.
Figure 4:
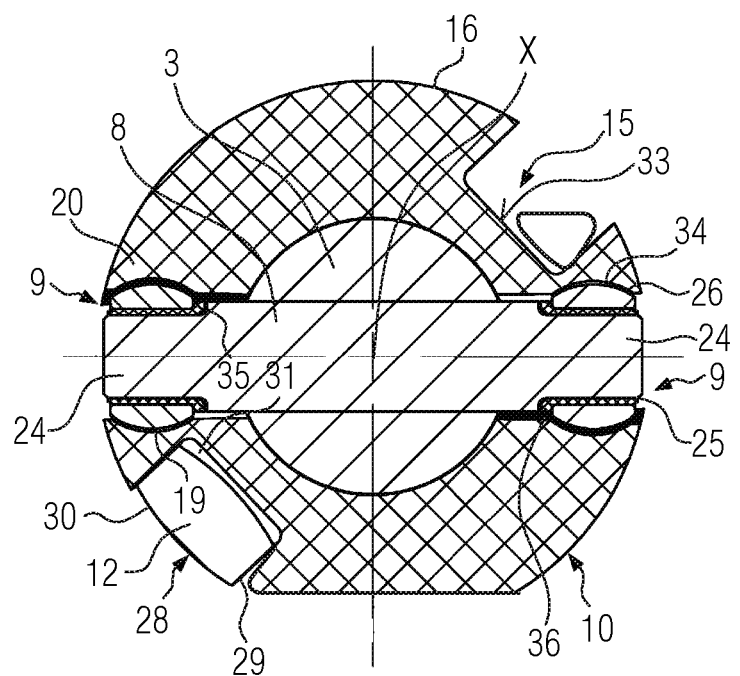
FIG. 4 shows a sectional view in the section plane IV-IV in FIG. 3.

FIGS. 2, 3, and 4 in conjunction with FIGS. 5 and 6 illustrate the interaction between the transverse axis 8 and the thread-like guide grooves 9 in the piston 10. The piston 10 may be a plastic molded part, for example an injection-molded part of reinforced polyoxymethylene.

Each guide groove 9 forms two opposing raceways 17 and 18 for a bush 26, which is rotatably arranged on the end 24 of the transverse axis 8. Each bush 26 is mounted on the end 24 with a bearing 25 (shown as a plain bearing, or a roller bearing, such as a needle bearing), wherein the bearing 25 may be fixed non-rotatably on the end 24. The bearings 25 shown in FIG. 4 extend up to shoulders 35 between the ends 24 and the middle part of the transverse axis 8 and in this region comprise ring flanges 36, which project outwardly, where FIG. 4 shows a sectional view of the section plane IV-IV of FIG. 3. The bush 26 is pushed loosely onto the bearing 25 in the axial direction of the transverse axis 8 and is axially positioned in the working position by form-fitting between a cambering 34 of the bush 26 and an undercut 19, 20 of the raceways 17, 18 of the guide grooves 9, without having to mount additional machine elements for this purpose.

The cambering 34 of the bushes 26 in the embodiment shown is spherical, but may be double-conical (not shown). Consistent with the cambering, the undercut 19, 20 of the raceways 17, 18 is either concavely curved following a circular arc section or is double-conical (not shown).

In order to be able to push the bushes 26 onto the ends 24 during the assembly of the rotary actuator D, in each guide groove 9 in the region of the bush assembly opening 21, the sides of the undercut 19, 20 running to the outside of the piston skirt 16 are removed arcuately at removals 22, 23, for this purpose approximately in the middle between the guide groove ends, i.e. in a region, in which torques to be transmitted are a minimum. The removals 22, 23 are shaped correspondingly to the outer circumference of the bushes 26. Alternatively, the bushes 26 may be preassembled with the bearings 25 and, if appropriate, then pushed or pressed on. During operation of the rotary actuator, the removals 22, 23 are not critical, since this area is quickly passed over by the bushes 26 without a risk of slipping, e.g. outwardly.

The configuration of the bush assembly opening 21 is indicated in FIGS. 5 and 6. Each removal 23, 22 extends approximately to half the depth of each undercut 19, 20 and runs essentially without transition into the deepest region or bottom of the undercut 19, 20. According to FIG. 6, the removal 22, 23 is designed corresponding to the circular outer circumference of the bush 26. Optionally, the removals 22, 23 of both guide grooves 9 are diametrically opposite in relation to the axis X in order to be able to mount both bushes 26 (with or without bearing 25) in the same position of the piston 10 (optionally). The bushes 26 may be made of plastic or a metal or an alloy, for example with sliding and rolling characteristics corresponding to the plastic material of the piston 10.

The load-specific configuration of the outer cross-section of the torque support 12 and the corresponding guides 15 increase the precision of the interaction, minimize the surface pressure and ensure a stable transmission of torques into the base 3 (or the cover 1). The form-fit between the cambering 34 and the undercuts 19, 20, which positions the bushes axially on the transverse axis 8, offers the advantage of a reduced surface pressure, since the contacting surfaces are enlarged, and which facilitates the assembly by omitting machine elements for the axial securing of the bushes 26 (with or without the bearings 25).

Further, not shown embodiments of the rotary actuator D as part of disk valves V are appropriate, which only provide one torque support 12 and one guide 15 in the piston 10 and/or only one guide groove 9 in the piston with only one bush 26 on the transverse axis. If the piston 10 is actuated in both directions, for example by an electromagnetic linear drive (spring 11 is omitted), the effective distance of the torque support 12 from the axis X may even be further enlarged by anchoring the torque support 12 in the housing 4 or the outer dimension of the rotary actuator D showing equal capabilities may be reduced.

The disk valve V equipped with the rotary actuator D as well is part of the present disclosure and shows an improved operating behavior and is easy to mount. In a beverage filling system, the disk valve requires low maintenance.

Further, FIGS. 1-6 show the relative positioning of various components of the receiver assembly. If shown directly contacting each other, or directly coupled, then such components may be referred to as directly contacting or directly coupled, respectively, at least in one example. Similarly, components shown contiguous or adjacent to one another may be contiguous or adjacent to each other, respectively, at least in one example. As an example, components lying in face-sharing contact with each other may be referred to as in face-sharing contact or physically contacting one another. As another example, elements positioned apart from each other with only a space there-between and no other components may be referred to as such, in at least one example.

As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The invention claimed is:

1. A rotary actuator for a disk valve, comprising a housing containing a linearly slidable piston and having a cover and a base, at least one thread-like guide groove in the piston, a shaft being rotatable about an axis of the rotary actuator, the shaft having a transverse axis which engages into the at least one guide groove in the piston, and at least one torque support engaging into a guide in the piston, wherein the at least one torque support is anchored in the housing parallel to the axis of the rotary actuator, wherein at least one end of the transverse axis comprises a bush contacting at least one raceway of the guide groove, wherein the bush is cambered and each raceway comprises an undercut corresponding to the cambering of the bush,
wherein the guide groove comprises a bush assembly opening, which is at least accessible from an outer circumference of the piston, and
wherein, at the bush assembly opening, one side of the undercut in each raceway is arcuately removed up to a bottom of the undercut and corresponding to an outer circumference of the bush.

2. The rotary actuator of claim 1, wherein the at least one torque support is anchored in the cover of the housing.

3. The rotary actuator of claim 2, wherein the at least one torque support is anchored in the base of the housing.

4. The rotary actuator according to claim 1, wherein the bush is double-conically or convexly cambered, and wherein the undercut is double-conically or concavely curved.

5. The rotary actuator according to claim 1, wherein the bush is spherically cambered.

6. The rotary actuator according to claim 1, wherein the undercut follows a circular arc section.

7. The rotary actuator according to claim 1, wherein the bush is loosely fitted onto the at least one end of the transverse axis, and wherein the bush is axially positioned on the end by form-fitting between the cambering and at least one raceway undercut.

8. The rotary actuator according to claim 7, wherein the bush is fitted onto the at least one end of the transverse axis via a roller bearing or via a plain bearing.

9. The rotary actuator according to claim 8, wherein the plain bearing pressed into the bush is loosely fitted with a peripheral flange up to a transverse axis shoulder and is positioned by the bush on the transverse axis.

10. The rotary actuator according to claim 1, wherein the bush assembly opening is formed in a middle portion of the guide groove between ends of the guide groove.

11. The rotary actuator according to claim 1, wherein the piston is a plastic molded part.

12. The rotary actuator according to claim 11, wherein the piston is an injection-molded part.

13. The rotary actuator according to claim 1, wherein the at least one torque support has a rectangular cross-section, a length of the rectangular cross-section parallel to the axis of the rotary actuator, and
wherein the piston, including a skirt of the piston, has the guide open to an outer circumference of the piston.

14. A beverage filling system having at least a disk valve, which is to be actuated by the rotary actuator according to claim 1.

\* \* \* \* \*